July 25, 1950 W. A. FLUMERFELT 2,516,688
BALL AND SOCKET ASSEMBLY
Filed July 19, 1947
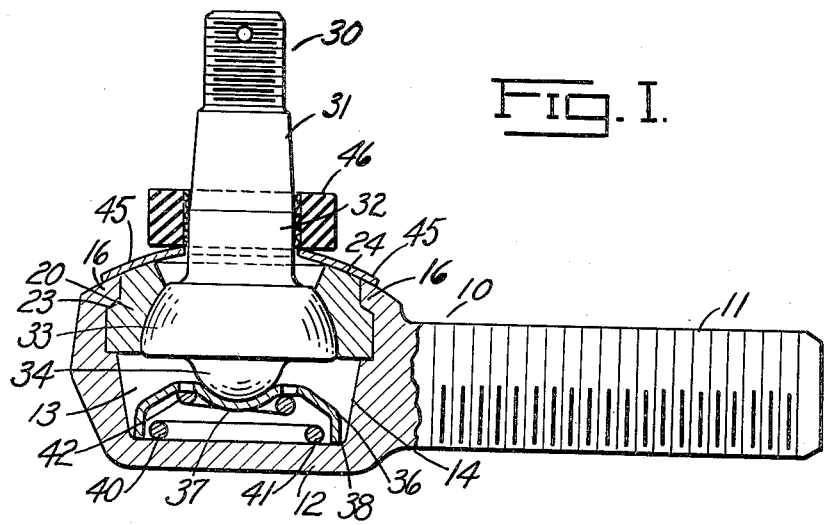
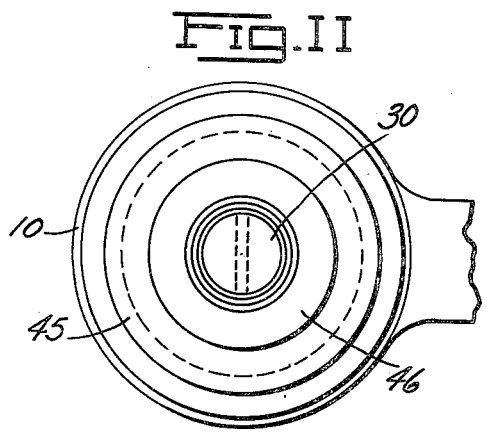
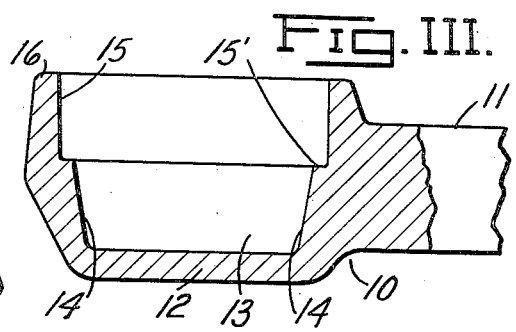
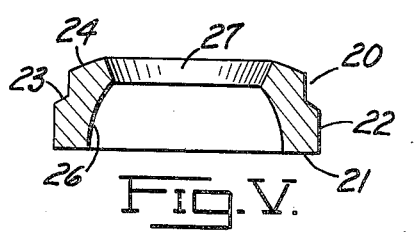
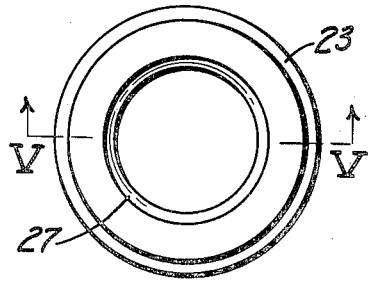
INVENTOR.
William A. Flumerfelt
BY Edmund B. Whitcomb
ATTORNEY

Patented July 25, 1950

2,516,688

UNITED STATES PATENT OFFICE 2,516,688

BALL AND SOCKET ASSEMBLY

William A. Flumerfelt, Columbus, Ohio, assignor to The Columbus Auto Parts Company, Columbus, Ohio, a corporation of Ohio Application July 19, 1947, Serial No. 762,075

5 Claims. (Cl. 287—90)

This invention relates to an improved universal ball and socket joint, particularly for use in tie rod constructions, and has for its object to provide a particularly compact and simplified arrangement in which parts heretofore used are eliminated; to the provision of a joint, the assembly and production of which, in large numbers, is greatly facilitated; and to greater accuracy in resultant constructions and a more uniform product under modern production methods in large quantities.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure I is a vertical sectional view of one embodiment of my improved universal joint;

Figure II is a top plan view;

Figure III is a sectional view of the one-piece housing before the joint is assembled;

Figure IV is a top plan view of the ball seat;

Figure V is a section of the line V—V of Figure IV.

Referring to Figures I and III, particularly the latter, 10 represents the one piece drop forged socket housing having an integral tenon 11 screw threaded for connection with a tie rod. The socket or housing 10 has a closed bottom or blind end 12; and as shown in Figure III, the receiving cavity 13 of the housing in the lower portion has tapered walls 14 allowing for the natural draft of the forging dies. As the piece comes from the forging, this taper extends to the top of the forging, and by my invention disclosed herein, it is only necessary for me to machine a cylindrical wall 15 extending from the top of the housing 10 to about midway of the cavity 13 as indicated. This provides a ledge 15' on said inner socket wall and at the top end, there is an upper lip or rim 16 on the housing 10 which, as will be hereinafter pointed out, is spun closed around the ball seat to hold the latter in place in assembling the joint.

A separate ball seat being used, no part of the housing need be provided with a hardened surface and in view of the fact, for example, that the socket is not coined or otherwise finished to give a hard surface and sufficient clearances for the internal parts of the joint is provided, normal forging variations encountered in practice may be disregarded and variations in metal volume are also of no consequence.

Referring to Figures IV and V, I show the hardened ball seat unit 20 detached from the joint. This ball seat consists of a ring 20 having a flat bottom face 21, an outside cylindrical wall 22, (to fit the wall 15 of the housing 10) a ledge 23, and an inclined top face 24 for its outside configuration. The inside configuration of the ball seat ring 20 includes the accurately formed, spherically shaped surface 26 extending from the bottom rim 21 to an outwardly flared enlargement or neck portion 27, the latter to permit shifting of the shank of the ball stud in use.

The ball seat 20 is separately hardened before assembly and in view of the fact that it is relatively small and of substantially uniform cross section, these units may be hardened in bulk with a minimum of distortion, and any corrections necessary may be effected by a simple procedure as by restriking in a press, for example. By providing a separate ring shaped ball seat 20, as shown in Figures IV and V, I avoid the necessity of attempting to make a hardened (coined) seat in the wall of the housing 10 itself.

The hardened ball and ball stud unit 30 shown in Figure I, includes the shank 31, neck 32, and spherically shaped ball portion 33. Of course, this surface 33 is hardened and finished to an accurate spherical configuration to provide a close initial fit between the hardened ball seat 20 and the ball, thereby assuring that wear between these meeting parts will be held to a minimum.

In the present embodiment of my invention, I provide the lower extremity of the ball 33 with a pivotal smaller bearing extension 34, forming a pivot for the swivel lug action of the joint in use.

A sheet metal spring seat 36 is depressed, as indicated at 37, to receive the pivotal extension bearing 34 at the end of the ball as shown in Figure I. It will be noted that the outside lower edge 38 of the spring seat 36 in the illustration may be spaced from the inner lower part of the wall 14 at the lower portion of the cavity 13 in the socket 10 and that variations in forging tolerances of this portion of the socket may occur in quantity production and the parts of the joint may be properly assembled as hereinafter pointed out without requiring an accurate fit of the parts.

Interposed between the closed bottom or blind end 12 of the socket 10 is the coil spring 40, the latter being coiled in a conical manner so as to provide an extended base 41 resting or supported on the inside of the bottom 12 of the housing 10. The spring 40 has a smaller terminal 42 at the upper end to contact the underside of the spring sheet metal 36 circumferentially adjacent the depression 37 which receives on its other side the pivotal ball seat extension 34 above referred to.

In assembly it will be seen that the spring 40 and spring seat 36 are located on the bottom or blind end 12 of the socket 10, whereupon the ball seat 20 combined with ball and ball stud 30 is inserted until the pivot 34 seats in the sheet metal spring seat 37. Then the upper lip 16 on the outside of the housing 10 is spun around the ledge or notch 23 in the ring 20 to securely hold all parts of the joint in assembled position as indicated in Figure I with the spring 40 under the desired amount of tension and the flat bottom face 21 of the seat 20 in contact with the ledge 15' on the inner wall of the socket 10. By this construction an important feature is that no separate closing washer is needed at the lower end of housing 10 because of the integral closed or blind end 12.

A dust guard 45 has a collar 46 fitting over the neck 32 of the ball stud and a metal flange or apron 47 located below said collar and extending over the top edge 24 of the ball seat 20 and the spun over end 16 of the housing 10.

It is apparent that, within the scope of the invention, modifications and different arrangements may be made other than is herein disclosed, and the present disclosure is illustrative merely, the invention comprehending all variations thereof.

What I claim is:

1. A universal joint comprising, in combination, an integral hollow housing and tenon member, said housing having an integral solid end wall, a flared inner base portion and an open end opposite said closed end; a solid ring-shaped hardened seat member having a spherically shaped inner bearing surface and an outwardly flared conical portion extending from one end of said spherical portion to the end of the ring, the outside wall of said ring comprising two cylindrical sections offset from each other to form a ledge on the outside portion of said ring, a portion of the inner side of said housing wall being shaped to conform to one of the cylindrical portions on said ring; an integral ball stud, half ball and central pip located in said housing with the spherical portion of said ball contacting the spherical surface of said seat member; an expanding spring and bearing means for supporting said ball stud member; an inturned flange on the open end of said housing contacting the ledge on said ring seat member and one of the cylindrical portions of said seat to retain the assembled joint with said spring means under compression to form wear take-up means; and a dust guard covering the open end of said housing, said dust guard fitting closely around the stud and covering and extending over the flared opening in said seat member and contacting the end of said seat member and the inturned flange on said housing.

2. A universal joint comprising, in combination, an integral hollow housing and tenon member, said housing having an integral solid end wall, a flared inner base portion and an open end opposite said closed end; a solid ring-shaped hardened seat member having a spherically shaped inner bearing surface and an inner terminal portion extending from one end of said spherical portion to the end of the ring, the outside wall of said ring comprising two cylindrical sections offset from each other to form a ledge on the outside portion of said ring, a portion of the inner side of said housing wall being shaped to conform to one of the cylindrical portions on said ring; an integral ball stud and ball located in said housing with the spherical portion of said ball contacting the spherical surface of said seat member; an expanding spring and bearing means for supporting said ball stud member; an inturned flange on the open end of said housing contacting the ledge on said ring seat member and one of the cylindrical portions of said seat to retain and fix said ring in said housing with said spring means under compression; and a dust guard covering the open end of said housing, said dust guard surrounding the stud and covering and extending over the opening in said seat member and contacting the end of said seat member and the inturned flange on said housing.

3. A universal joint comprising, in combination, an integral hollow housing and tenon member, said housing having an integral solid end wall, an unfinished flared inner base portion and a cylindrical upper portion forming a ledge between said portions on the inner wall of said housing, said housing having an open end opposite said closed end; a solid ring-shaped seat member having a spherically shaped inner bearing surface and an outwardly flared conical portion extending from one end of said spherical portion to the end of the ring, the outside wall of said ring comprising two cylindrical sections offset from each other to form a ledge on the outside portion of said ring, the lower edge of said ring resting on the ledge of the inner wall of said housing and one of the cylindrical portions of said ring fitting within the cylindrical portion of said housing; an integral ball stud, half ball and central pip located in said housing with the spherical portion of said ball contacting the spherical surface of said seat member; an expanding spring and bearing means for supporting said ball stud member; an inturned flange on the open end of said housing contacting the ledge on said ring seat member and one of the cylindrical portions of said seat to fix the ring in the housing of the assembled joint with said spring means under compression to form wear take-up means; and a dust guard covering the open end of said housing, said dust guard fitting closely around the stud and covering and extending over the flared opening in said seat member and contacting the end of said seat member and the inturned flange on said housing.

4. In a ball and socket universal joint, the combination of an integral socket and tenon member, said socket including a housing having an inwardly extending ledge on its inner wall located between the opposite ends of the socket, an integral closed end wall and an open end opposite said closed end; a solid ring-shaped hardened seat member having a spherically shaped inner bearing surface and an inner terminal portion extending from one end of said spherical portion to the end of said seat member, the outside surface of said seat comprising two sections, one having a greater periphery than the other to form a ledge between said sections on the outside portion of said seat member; said seat member contacting said socket ledge in the inner wall of said socket; an integral ball and stud unit with the ball part thereof located in said housing and the spherical portion of said ball contacting the spherical surface of said seat member and the stud extending through said housing; an expanding spring and bearing means for supporting said ball stud unit; an inwardly extending flange on the open end of said housing contacting said seat member to retain and fix the same in said housing between said inwardly extending flange and said inwardly extending ledge in the inner wall of said housing with the spring means under compression; and a dust guard for the joint surrounding said stud.

5. In a ball and socket universal joint, the combination of a socket housing, having an inwardly extending ledge on its inner wall located between the opposite ends of said socket housing, an integral closed end wall and an open end opposite said closed end; a solid ring-shaped hardened seat member having a spherically-shaped inner bearing surface and an outside surface constructed to form a transversely extending ledge portion for receiving a retaining flange on said housing socket; said seat member contacting said socket ledge in the inner wall of said socket; an integral ball and stud unit with the ball part thereof located in said housing and the spherical portion of said ball contacting the spherical portion of said seat member and the stud extending through said housing; expanding resilient means interposed between said closed end on said socket housing and said ball part; and a retaining inwardly extended portion on said socket housing contacting said transverse ledge portion of said seat member to retain and fix said seat member in said housing socket with the edge of said seat member located on said inwardly extending ledge in the inner wall of said socket housing with said resilient means under compression.

WILLIAM A. FLUMERFELT.

REFERENCES CITED

The following references are of record in the file of this patent:

UNITED STATES PATENTS

| Number | Name | Date |
|---|---|---|
| 1,845,697 | Baker | Feb. 16, 1932 |
| 2,009,401 | Hufferd et al. | July 30, 1935 |
| 2,124,034 | Hufferd | July 19, 1938 |